Figure 1:
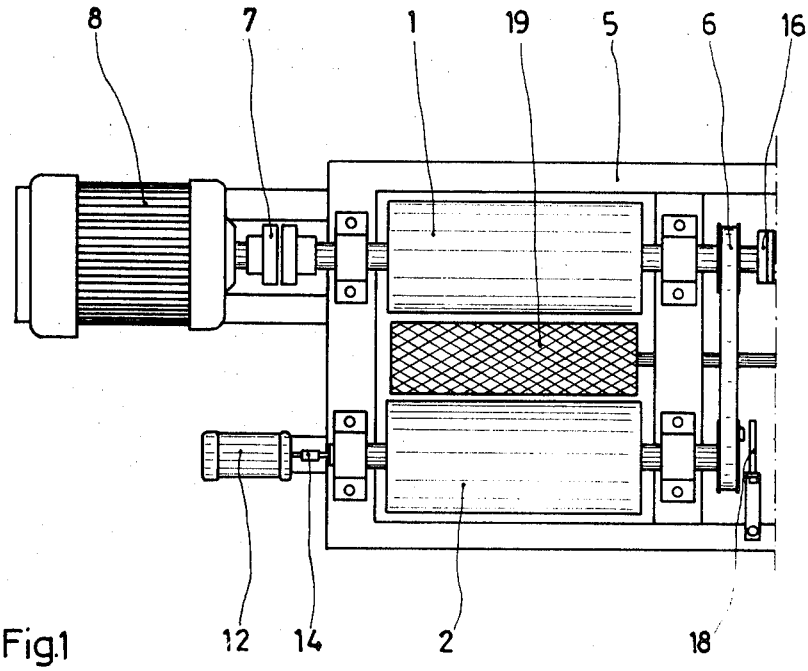
Figure 1:
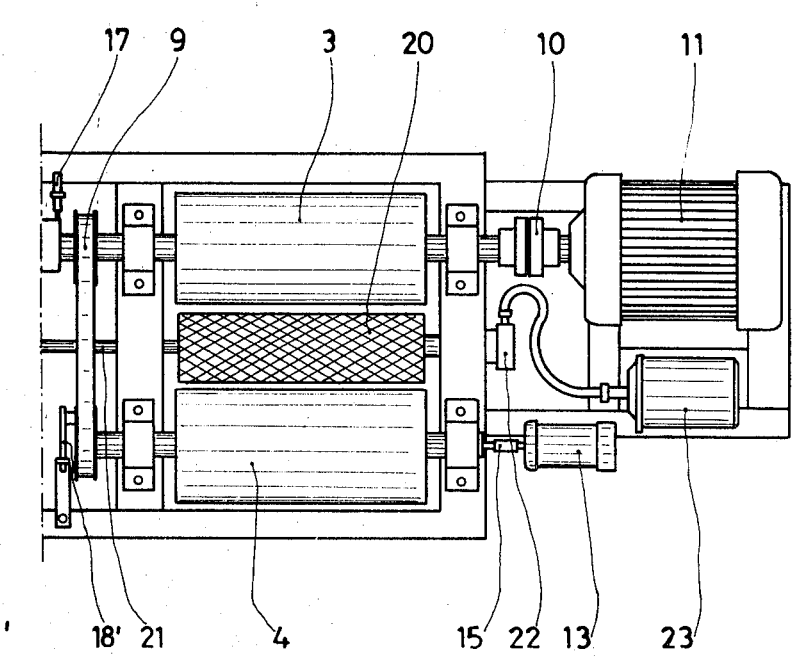

United States Patent
Sturmo et al.

[15] 3,690,165
[45] Sept. 12, 1972

[54] AUTOMOBILE TESTER

[72] Inventors: Giuseppe Sturmo, Rome; Mario Maran, Vicenza, both of Italy

[73] Assignee: F.A.V., S.r.l., Rome, Italy

[22] Filed: May 14, 1970

[21] Appl. No.: 37,129

[30] Foreign Application Priority Data

Aug. 28, 1969 Italy..................61621 A/69

[52] U.S. Cl.................................73/117, 73/126
[51] Int. Cl..........................................G01l 5/13
[58] Field of Search..............................73/117, 126

[56] References Cited

UNITED STATES PATENTS

| | | | |
|---|---|---|---|
| 1,987,706 | 1/1935 | Prentiss | 73/126 |
| 3,286,517 | 11/1966 | Ostrander | 73/117 |
| 3,289,471 | 12/1966 | Maxwell | 73/117 |
| 3,527,090 | 9/1970 | Imada | 73/117 UX |
| 3,333,463 | 8/1967 | Hollinghurst | 73/117 |
| 3,554,022 | 1/1971 | Geul | 73/117 |

Primary Examiner—Jerry W. Myracle
Attorney—William Anthony Drucker

[57] ABSTRACT

A test-bed for automobile vehicles has pairs of coupled rollers to receive each of the wheels of the vehicle, with a tachymetric dynamo coupled to each pair. An electrical machine, capable of functioning selectively as a motor or as a generator is coupled to each pair of rollers. The circuitry of the electrical machines is such that the torque exerted (when they act as a motor) or the resistance coupled exerted (when they act as a generator) can be made to compensate exactly, at various speeds, for the differences which exist between the equivalent moment of inertia of the vehicle and the effective moment of inertia possessed by the rotating parts of the test-bed.

5 Claims, 2 Drawing Figures

INVENTORS:
GIUSEPPE STURMO
MARIO MARAN

AUTOMOBILE TESTER

The object of the present invention is to provide a test-bed for automobiles which makes it possible to test the brakes of the vehicle, its acceleration, the power of the engine, to check the vehicle's speedometer, to check the mechanical power wasted through friction in the complex of moving parts of the automobile, and in general any test which might be required by the movement of the automobile.

It must be stated first of all that there are some types of automobile test-beds in which the vehicle rests with a pair of wheels on rollers, which receive the movement of the motor wheels themselves, imitating progress along a road.

In other types of test-bed there are also electric motors, connected to the rollers carrying the automobile, of which, however, the only purpose is to make the rollers rotate.

By means of a mechanical brake, for example of the counterweight type, or else an electromagnetic brake, a resistance couple is made which can be regulated and measured; this makes it possible to measure the power of the motor at each given number of revolutions per minute.

It is possible also to test the power of the vehicle's brakes by measuring the deceleration of the rollers and using calibration tables.

On the other hand, it has not been possible, with appliances of known types, to reproduce completely the kinetic energy possessed by the automobile in movement at a determined speed, nor to provide for the modification at random of the moment of inertia of the rotating parts, in order to adapt them to the different values of the inertial mass of the vehicles under test.

This requires a very complex arrangement and one which is not easy to manipulate, if these variations are to be obtained simply and by mechanical means.

Besides, a continuous variation of the equivalent moment of inertia could not be obtained.

The fundamental concept, on which the appliance of this invention is based, lies in the fact that, in braking or acceleration tests, each pair of rotating rollers on which the automobile's wheels rest is connected to a rotating electrical machine, which can function either with a motor or with a generator, according to need, either supplying or consuming energy, which will therefore either add to or subtract from the kinetic energy present in the rollers, when they rotate at a determined speed, modifying it at random, to be greater or less, in order to make it correspond exactly with the kinetic energy possessed by the inertial mass of the automobile in movement, and giving rise to a couple which is opposed to the variations in speed, in the same way as an inertial mass and therefore in such a way as always to satisfy the equation:

$$\tfrac{1}{2} m v^2 = \tfrac{1}{2} J \omega^2 \qquad (1)$$

where:
- $m$ = the mass of the automobile
- $v$ = the simultaneous speed of the vehicle
- $j$ = the equivalent moment of inertia
- $\omega$ = the angular velocity of the rollers.

With suitable control of the currents circulating in the rotating electrical machines it is possible to reproduce exactly with the same pair of rollers the energy conditions of any automobile in movement at any speed, either by making the rollers rotate by means of the engine of the automobile, or by keeping them at speed by means of the electrical motors connected to them.

The apparent speed of the automobile is measured by applying a speedometer connected to any of the rotating parts of the appliance, while two revolution counters, coupled to rotating parts, suitably connected with the two pairs of bearing rollers, provide for the measurement of the braking distance for each individual wheel separately.

This can be measured separately for each driving or driven wheel of the automobile by arranging two pairs of separate rollers, each connected with its own rotating electrical machine.

The test is carried out separately on the driving wheels and the non-driving wheels on an appliance comprising two pairs of rollers, or else on the four wheels at the same time, in the case in which they are all driving wheels, with two identical appliances, each comprising two pairs of rollers.

Whenever the test-bed has to carry out tests on the braking of automobiles, of which the mass develops a kinetic energy greater than that developed by the moment of inertia of the rollers, the electrical machines connected to the same test-bed rollers have to function as motors.

In that case the electrical motors have to develop a torque proportional to the product of the difference between the moment of inertia equivalent to the mass of the automobile, or rather that moment of inertia which at the simulated velocity presents the same kinetic energy as the automobile, and that of the test-bed rollers, multiplied by the angular deceleration of those same rollers:

$$C_{ME} = (J_X - J_0) \cdot (d\omega/dt) \qquad (2)$$

where:
- $J_X$ = the equivalent moment of inertia of the automobile
- $J_0$ = the moment of inertia of the rotating complex of the bed
- $d\omega/dt$ = the angular deceleration of the rollers, corresponding to that of the simulated speed.

i.e., on the basis of the second law of dynamics applied to rotating bodies.

It is clear that, under such conditions, the braking couple produced by the braking mechanism of the automobile must counterbalance not only the torque due to the sudden deceleration of the test-bed rollers, but also the torque due to the electrical machines connected to them, which in this case function as motors.

However, a dynamic equilibrium is stabilized, and this makes it possible to determine, before calibration of the test-bed, the deceleration produced by the braking mechanism of the automobile, corresponding to a determined value of the pressure acting on the brake pedal, by means of which the braking couple also could be removed.

Still in correspondence with a determined pressure applied to the brake pedal it is possible to measure the braking distance corresponding to a determined speed in revolutions per minute of the automobile, this being more clearly devoted to practical purposes.

Whenever an automobile of small dimensions presents an equivalent moment of inertia which is smaller than the moment of inertia of the test-bed rollers, the electrical machines connected to them must function as generators, so that they produce a resistance couple proportional to the product of the difference between the moment of inertia of the test-bed rollers and the moment of inertia equivalent to the inertial mass of the machine, with the angular deceleration:

$$C_{ME} = (J_0 - J_x) \cdot (d\omega/dt) \quad (3)$$

It will be possible in this way, in the case of any type of automobile, to fix beforehand the value of the load resistance and that of the inductor flux of the electrical machine functioning as a generator, in relation to the value of the angular velocity and the angular deceleration of the rollers, and so to make the torque correspond with the value given by (3). This can be obtained, for example, by means of programming appliances, e.g., with electronic circuits, of the exciting current in the electrical machines, connected to an instrument showing the rotation speed of the rollers, consisting, for example, of a tachymetric dynamo connected to the shaft of the electric machine.

Naturally, the programming appliance must include an adjustable element, in order that it may be arranged beforehand on the basis of the mass of the automobile under test.

It is not considered necessary to describe such an appliance in detail, especially as it can be made in various ways and according to techniques which are well known, so that it is within the competence of a specialist in this field.

Provision is also made for inserting at will one or more pairs of flywheels, with a different moment of inertia, in the rotating system in order to reduce equally with the field of measurement of the test-bed the nominal power of the electrical machines associated with it.

In the accompanying drawings, the figures are limited to the illustration of two particular methods of constructing the test-bed, shown simply by way of non-limiting example. In these drawings:

FIGS. 1–1' show a general plan view of one embodiment of construction of the test-bed.

Figure 2:
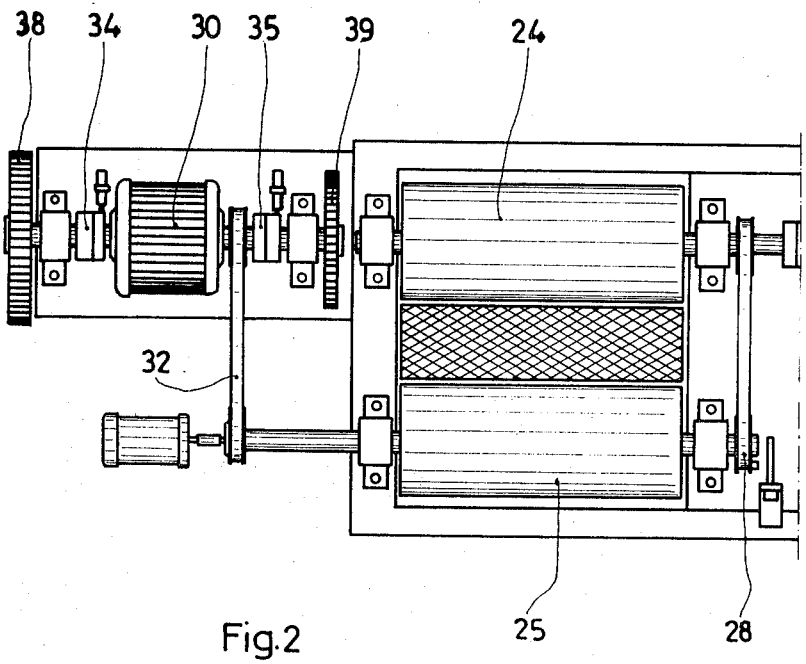
Figure 2:
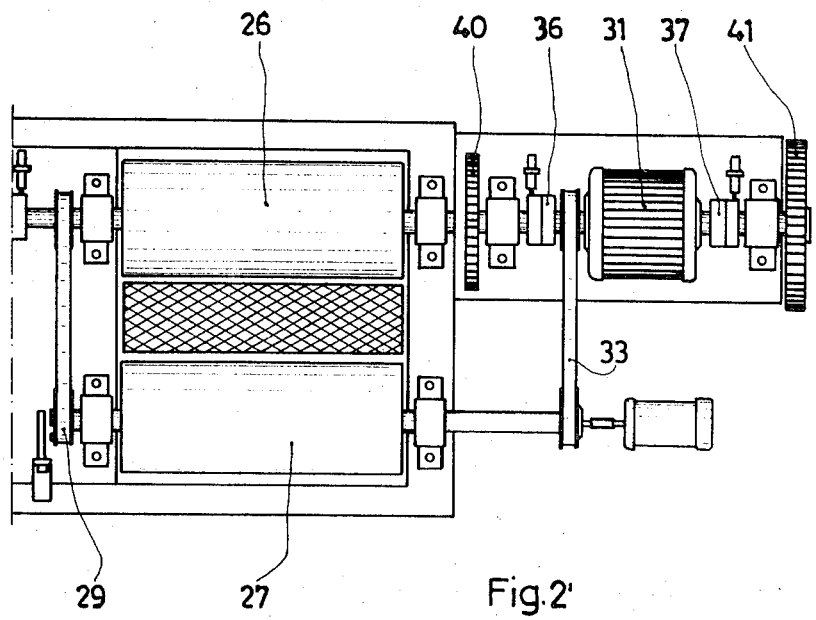

FIGS. 2–2' show a general plan view of a second embodiment of construction of the test-bed.

In the first embodiment, illustrated in FIGS. 1–1', the test-bed comprises a pair of rollers 1 and 2, as well as a second pair of rollers 3 and 4, mounted on bearings fixed to a frame with a base 5.

Rollers 1 and 2 of the first pair are connected together by a cog-belt 6, while roller 1 is connected by means of joint 7 to the electrical machine 8.

Rollers 3 and 4 of the second pair are connected together by a cog-belt 9, while roller 3 is connected, by means of joint 10 to the electrical machine 11.

The tachymetric dynamos 12 and 13 connected to the rotating shafts of rollers 2 and 4 by means of elastic joints 14 and 15 make it possible to measure the rotation speed of rollers 2 and 4 and consequently, before calibration, the apparent forward speed of the automobile under test.

The two pairs of rollers 1–2 and 3–4 are connected together by a coupling, e.g., an electromagnetic control clutch 16, which is open, when it is desired to make tests separately on the individual wheels.

Clutch 16 is controlled through brush 17, which slips on a current collecting ring.

With clutch 16 open, for example, it is possible to take measurements of the braking distance, for a determined speed, measuring separately the braking distance for each single wheel, by means of impulse switches 18 and 18' and another equivalent appliance (revolution counter) connected to rollers 2 and 4 on which the single wheels rest.

Idler rollers 19 and 20 which, for example, can be lifted mechanically by means of levers connected to rod 21, which is moved by an oil-powered jack 22, supplied with oil under pressure from the cylinder 23, make it possible to lift the wheels of the automobile under the test from the test-bed rollers, at the same time stopping the rotation of the rollers.

As has been stated above, the fundamental concept of the invention consists in the fact that, by making the electric machines 8 and 11 function either as motors or as generators, it will be possible to compensate the differences in the moment of inertia of the rotating masses of rollers 1–2 and 3–4, with respect to the equivalent moment of inertia of the automobile under test; to be precise, in the case of automobiles with an equivalent moment of inertia which is greater than that of the rollers, the electrical machines 8 and 11 will function as motors furnishing the energy needed to compensate the smaller kinetic energy of the rotating parts, while if the automobile under test shows an equivalent moment of inertia smaller than that of the test-bed rollers, electrical machines 8 and 11 will have to function as generators, which will get rid of the energy produced in many of the rotating parts on applied load resistances.

With a suitable choice of moments of inertia of rollers 1, 2, 3 and 4, it will still be possible to reduce to a minimum the types of automobile which are obliged to make the electrical machines function as motors, by keeping extremely low the maximum power drawn from the mains, by comparison with the other high-speed test-bed brakes now existing on the market.

In the second embodiment of the invention, illustrated in FIGS. 2–2', rollers 24–25 and 26–27, connected together by the respective cog-belts 28 and 29 are connected to the electrical machines 30 and 31 by respective cog-belts 32 and 33.

The electro-magnetic control clutches 34–35 and 36–37 make it possible for the operator to connect at will the fly-wheels 38–39 and 40–41 with electrical machines 30 and 31, in order to add their moment of inertia to that of rollers 24–25 and 26–27, thus reducing the nominal power of the electrical machines, which have to compensate much smaller differences in moment of inertia.

With the insertion of two pairs of fly-wheels it is possible to have four ranges of moments of inertia equivalent to those of the automobiles under test, each corresponding with the different conditions of functioning of the electrical machines 30 and 31.

For the rest the test-bed is similar to that illustrated in FIGS. 1–1'.

Apart from the braking tests already cited, with the test-bed of the present invention it is possible to carry out power tests by making the electrical machines function as generators and measuring the power delivered by them under load; also tests of speed control on automobiles or calibration of the automobile's speedometer by checking with the tachymetric dynamos, tests to check the mechanical power wasted by friction in all the moving parts of the automobile, by making the electrical machines function as motors and measuring the power used, from which are deducted the known mechanical losses of the test-bed.

Provision is also made for connecting to the tachymetric dynamos some instruments to register deceleration, these make it possible to take away the braking couple of the braking mechanisms of the automobiles at various speeds as a function of the force applied to the brake pedal, as well as removing, at a low revolution speed, the geometry of the brakes, or rather the variations of the braking couple corresponding to the rotation angle of each wheel.

We claim:

1. A test-bed for automobile vehicles comprising: two pairs of rollers, each said pair of rollers being intended to receive thereon one of two wheels of the vehicle under test; means coupling rotationally one roller of each pair with the other roller of said pair; a respective tachymetric dynamo coupled rotationally to each pair of rollers; a rotatable electrical machine coupled rotationally with each said pair of rollers and said machine functioning selectively as an electrical motor and as an electrical generator, said machine including means responsive to the torque exerted when functioning as an electrical motor and to the resistance couple exerted when functioning as an electrical generator, which means compensates, under conditions of varying speed, the difference between the equivalent moment of inertia of the vehicle under test and the effective moment of inertia possessed by the rotating parts of the test-bed; and a programming device connected to the machine and to the tachymetric dynamo and stabilizing the electrical machine when said machine functions as an electrical motor, in response to a determined value of load resistance, said programming device being interlocked with the simulated speed of the vehicle as measured by said tachymetric dynamo and varied according to said speed, said programming device operating according to the relationship:

$$C_{ME} = (J_x - J_o)(d\omega/dt) \text{ where:}$$

$C_{ME}$ = the torque couple of the rotatable electrical machine.

$J_x$ = the equivalent moment of inertia of the automobile.

$J_o$ = the moment of inertia of the rotating complex of the test bed.

$d\omega/dt$ = the angular deceleration of the rollers, corresponding to that of the simulated speed.

2. A test-bed for automobile vehicles, as claimed in claim 1, comprising respective revolution counters coupled to the breaking means and to the pairs of rollers receiving the wheels of the vehicle, said counters commencing to operate at the moment when braking commences so as to measure the braking distance at a test speed of the stationary vehicle, separately for each wheel of the vehicle and corresponding to a measured force applied to the brake pedal.

3. A test-bed for automobile vehicles, as claimed in claim 1, comprising means for measuring power delivered by said electrical machines functioning as electrical generators, thereby to measure the motive power of the vehicle under test.

4. A test-bed for automobile vehicles, as claimed in claim 1, comprising flywheel means, and means for coupling said rollers thereto, said flywheel means serving to reduce the differences between the moment of inertia of the rollers and the equivalent moment of inertia of the vehicle under test, and thereby reduce the nominal power of the electrical machines and thus also the power needed to compensate a given range of vehicles under test.

5. A test-bed for automobile vehicles, as claimed in claim 1, comprising apparatus for registering deceleration coupled to said tachymetric dynamos and eliminating both the braking couple of the braking mechanism of the vehicle as a function of the speed in relation to a determined value of the force applied to the brake pedal, and at low speed the geometry of the braking system.

* * * * *